US006984328B2

(12) United States Patent
Sasowsky et al.

(10) Patent No.: US 6,984,328 B2
(45) Date of Patent: Jan. 10, 2006

(54) METHOD FOR REMOVING METALS FROM AQUEOUS SOLUTIONS USING MIXED LITHIC MATERIALS

(75) Inventors: Ira D. Sasowsky, Akron, OH (US); Christopher M. Miller, Wadsworth, OH (US); Annabelle M. Foos, Cuyahoga Falls, OH (US)

(73) Assignee: University of Akron, Akron, OH (US)

( * ) Notice: Subject to any disclaimer, the term of this patent is extended or adjusted under 35 U.S.C. 154(b) by 175 days.

(21) Appl. No.: 09/776,298

(22) Filed: Feb. 2, 2001

(65) Prior Publication Data

US 2003/0146163 A1 Aug. 7, 2003

Related U.S. Application Data

(60) Provisional application No. 60/179,832, filed on Feb. 2, 2000.

(51) Int. Cl.
C02F 1/52 (2006.01)
(52) U.S. Cl. ............... 210/713; 210/721; 210/724; 210/912
(58) Field of Classification Search ........... 210/713, 210/721, 724, 912
See application file for complete search history.

(56) References Cited

U.S. PATENT DOCUMENTS

| 1,742,110 A | * | 12/1929 | Wiehe | 210/749 |
|---|---|---|---|---|
| 3,840,365 A | * | 10/1974 | Hammes et al. | 204/248 |
| 4,465,597 A | * | 8/1984 | Herman et al. | 210/713 |
| 4,764,284 A | * | 8/1988 | Jansen | 210/715 |
| 4,793,276 A | * | 12/1988 | Stafford | 114/300 |
| 4,824,572 A | * | 4/1989 | Scott | 210/602 |
| 4,917,802 A | * | 4/1990 | Fukaya et al. | 210/500.1 |
| 5,108,614 A | * | 4/1992 | Ross et al. | |
| 5,156,746 A | * | 10/1992 | Maree et al. | 210/712 |
| 5,158,686 A | * | 10/1992 | Kigel | 210/713 |
| 5,158,835 A | * | 10/1992 | Burke | 106/782 |
| 5,298,173 A | * | 3/1994 | Burke | 106/782 |
| 5,427,691 A | * | 6/1995 | Kuyucak et al. | 210/713 |
| 5,603,843 A | * | 2/1997 | Snee | 210/748 |
| 5,635,073 A | * | 6/1997 | Aktor et al. | 210/714 |
| 5,863,422 A | * | 1/1999 | Watten | 210/150 |
| 5,863,433 A | * | 1/1999 | Behrends | 210/150 |
| 5,945,035 A | * | 8/1999 | Vogt et al. | 252/520.1 |
| 6,033,559 A | * | 3/2000 | Bender et al. | 210/150 |
| 6,033,562 A | * | 3/2000 | Budeit | 210/199 |
| 6,446,031 B1 | * | 9/2002 | Welch | 703/2 |
| 6,528,554 B1 | * | 3/2003 | Isayev et al. | 522/111 |
| 2004/0031753 A1 | * | 2/2004 | Herman et al. | 210/617 |

FOREIGN PATENT DOCUMENTS

JP        53082052 A  *  7/1978

OTHER PUBLICATIONS

Metcalf, "American Sewerage Practice, vol. III Disposal of Sewage," McGraw-Hill, 1935, p. 493-494.*

Chapman, B.M., Jones, D.R., and Jung, R.F. (1983) Processing Controlling Metal Ion Attenuation In Acid Mine Drainage Systems. *Geochimica et. Cosmochimica Acta*, 47, 1957-1973.

Edwards, M. and Benjamin, M.M., 1989, Adsorptive Filtration Using Coated Sand: A New Approach For Treatment Of Metal-Bearing Wastes: Journal WPCF, v. 61, No. 9, p. 1523-1533.

Hedin, R.S., Nairn. R.W., and Kleinmann, R.L.P., 1993?. Passive Treatment Of Coal Mine Drainage: U.S. Bureau of Mines Circular 9389, 35p.

Hedin, R.S., Watzlaf, G.R., and Nairn, R.W. (1994) Passive Treatment Of Acid Mine Drainage With Limestone. *Journal of Environmental Quality* 23, 1338-1345.

Pearson, F.H. and McDonnell, A.J. (1975a) Use Of Crushed Limestone To Neutralize Acid Wastes. *Journal of the Environmental Engineering Division, American Society of civil Engineers*, 101, 139-158.

Pearson, R.H. and McDonnell, A. J. (1975b) Limestone Barriers To Neutralize Acidic Streams. *Journal of the Environmental Engineering Division, American Society of civil Engineers*, 101, 425-440.

Ziemkiewicz, P.F., Skousen, J.G., Brant, D.L., Sterner, P.L., and Lovett, R.J. (1997) Acid Mine Drainage Treatment With Armored Limestone In Open Limestone Channels. *Journal of Environmental Quality*, 26, 1017-1024.

* cited by examiner

*Primary Examiner*—Chester T. Barry
(74) *Attorney, Agent, or Firm*—Roetzel & Andress; George W. Moxon, II

(57) ABSTRACT

The present invention provides a process for removing metals from aqueous solutions. This process entails contacting the aqueous solution with at least one neutralizing agent and at least one precipitating agent that preferentially precipitates metals from the aqueous solution. The neutralizing agent is a lithic material that neutralizes the acidity of the aqueous solution to promote the precipitation of metals form the aqueous solution. The precipitating agent is a lithic material that serves as a preferred locus of deposition for the metals precipitated by the neutralizing agent, i.e. those metals precipitated form the aqueous solution during neutralization.

12 Claims, No Drawings

METHOD FOR REMOVING METALS FROM AQUEOUS SOLUTIONS USING MIXED LITHIC MATERIALS

This Application gains priority from U.S. Patent Ser. No. 60/179,832 filed on Feb. 2, 2000.

TECHNICAL FIELD

The present invention generally relates to a process for removing metals from aqueous solutions and neutralizing acidic waters. Specifically, the present invention is a method of removing dissolved metal from water using a neutralizing agent and a preferentially precipitating complementary material. More particularly, the present invention relates to an improved method of removing dissolved metals from water using mixed lithic (rock and/or mineral) materials.

BACKGROUND OF THE INVENTION

Acidic mine drainage (AMD) is a pervasive environmental problem around the world. It affects, for example, over 23,000 kilometers of streams in the United States alone. AMD forms when mining activities expose sulfide minerals to the near-surface environment and oxygen-rich water. The result is the aqueous transfer of metals (e.g. Fe, Al, and Mn) and low pH water (pH less than 4) to streams, lakes, and aquifers. This often contributes to the destruction of aquatic habitat and organisms. Impact may continue indefinitely even after mining ceases. Many present-day problem sites are mines that have been abandoned for over 100 years. Long-term, cost-effective treatment techniques for mine drainage have been avidly pursued, particularly in regions such as the western United States where between 20,000 and 50,000 mines are currently generating acidity. In these situations, techniques that are passive and require little or no maintenance are most desirable. Constructed wetlands or anoxic limestone drains are two commonly used options. They trigger the precipitation of dissolved metals from the water through reduction of acidity or other mechanisms.

Pyrite ($FeS_2$), a major source of acidic mine drainage, oxidizes according to the following reactions:

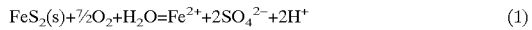

$$FeS_2(s) + 7/2 O_2 + H_2O = Fe^{2+} + 2SO_4^{2-} + 2H^+ \quad (1)$$

$$Fe^{2+} + 1/4 O_2 + H^+ = Fe^{3+} + 1/2 H_2O \quad (2)$$

$$Fe^{3+} + 3H_2O = Fe(OH)_3(s) + 3H^+ \quad (3)$$

The oxidation of one mole of pyrite releases four moles of $H^+$, typically generating waters with pH values of 2 to 3. Under abiotic conditions the rate-determining step in the sequence of reactions is the oxidation of ferrous iron by reaction (2) which is negligible (a half-life of many years) below a pH of 5.5. With biotic mediation, however, microbial catalysis by autotrophic iron bacteria such as *Thiobacillus ferrooxidans* dramatically increases the rate of ferrous iron oxidation.

The vast majority of mines in the world occur in drainage basins containing no exposed limestone that could act as a natural neutralizing agent. However, on the Western Cumberland Plateau Escarpment of Tennessee (USA) where coal has been historically mined several stream basins exist where limestone is exposed.

Treatment techniques for mine drainage, such as wetlands or anoxic limestone drains, have focused on the reduction of acidity and the precipitation of dissolved metals from the water. Limestone, in both oxic and anoxic settings, is inexpensive and has been frequently used to neutralize acidity. In the presence of oxygen (oxic conditions), neutralization promotes the precipitation of iron oxide, along with other trace oxides. Limestone, by itself, is not an ideal solution. For example, the use of limestone by itself results in an undesirable side effect. Neutralization by limestone increases precipitation of amorphous iron hydroxide. Upon formation, the precipitate coats the limestone surface, ultimately inhibiting further neutralization, and causing failure of the remedial system. Anoxic limestone drains control this problem by excluding oxygen and preventing reactions (2) and (3) from proceeding, so no iron hydroxide precipitates.

The precipitate formed by hydrolyzing ferric iron (as in reaction (3) above) is usually cited as amorphous ferrihydrite and its composition is given for simplicity as $Fe(OH)_3$. The actual precipitate is a mixture of phases including goethite, ferrihydrite, jarosite and an oxyhydroxysulfate of iron. The ferrihydrite precipitated by acidic mine drainage may contain substantial quantities of elements other than iron, particularly silica, manganese, sulphate, aluminum and arsenic. Precipitates from the oxidation of ferrous iron play an important role in the removal of trace metals (e.g. Cu, Zn, Cd, Pb, and As) from mine drainage because the of the precipitates' low crystallinity and high surface area make them very effective in adsorbing trace metals.

The overall rate of iron removal in streams is highly variable, with reported values ranging from $10^{-1}$ to $10^{-6}$ mol/L/s. Ferrihydrite precipitated by AMD may contain substantial quantities of elements other than iron, particularly silica, manganese, sulfate, aluminum and arsenic. For these reasons, it is beneficial to promote the precipitation of iron.

An additional concern associated with using limestone by itself relates to its known effect on solution chemistry. It has been shown that the high concentrations of bicarbonate in solution from limestone addition result in significant sulfate release from precipitated iron oxyhydroxides, a previously unreported negative consequence of limestone neutralization.

The remediation of streams adversely affected by acidic mine drainage often employs limestone as a neutralization agent. However, metal precipitation on the limestone surface can render it ineffective. Additionally, large amounts of sulfate may be released using this method. Leaving the water acidic harms aquatic plant and animal life and leaves the water contaminated with harmful metals. An improved method of neutralizing the acidic waters and removing the metals from the waters is therefore needed.

Acidified waters can also come from sources other than mine drainage. Acid rain is responsible for damaging aquatic life, the environment and public infrastructure especially in the northeast portion of the United States. Natural waters, such as lakes, rivers, reservoirs, creeks and streams, in this region are routinely found to have very low pH levels. Attempts to remediate the acidified waters have met with limited success for the reasons outlined above. There is still a need for a method of neutralizing acidified waters caused by acid rain that (1) is not rendered ineffective by a coating of precipitated metals, (2) does not release sulfates and (3) removes unwanted metals from the affected waters.

Industry also faces a challenge with acidified waste or process streams or waste or process streams that contain metal contaminates. City and municipal drinking, sewage, storm and waste water plants also have a need for an improved method of deacidifying or removing metals dissolved or suspended in their waste or process streams.

SUMMARY OF THE INVENTION

In general, the present invention provides a process for removing metals from aqueous solutions. This process entails contacting the aqueous solution with at least one neutralizing agent and at least one precipitating agent that preferentially precipitates metals from the aqueous solution.

The neutralizing agent is a lithic material that neutralizes the acidity of the aqueous solution to promote the precipitation of metals from the aqueous solution. Non-limiting examples of useful neutralizing agents include limestone, marble, calcium carbonate, calcite, dolostone, and dolomite. It will be appreciated that other basic lithic materials may also be used.

The precipitating agent is a lithic material that serves as a preferred locus of deposition for the metals precipitated by the neutralizing agent, i.e. those metals precipitated from the aqueous solution during neutralization. Thus, by "preferentially precipitates" it is meant that the precipitating agent serves to attract the precipitating metals to a greater degree than the neutralizing agent, with the effect that the neutralizing agent is at least less rapidly coated with the precipitating metals and can therefore continue its neutralizing function for a more significant amount of time. Non-limiting examples of useful precipitating agents include sandstone, quartz, siltstone, quartzarenite, arkose, shale, feldspar, illite, and gravel.

The typical metals targeted for removal from aqueous solutions include iron, iron oxide, silica, aluminum oxide, aluminum, magnesium, cadmium, copper, chromium, nickel, lead, and zinc. Generally, the process of the present invention may be employed to remove these and other dissolved or suspended metals during a change in pH of the aqueous solution. It should therefore be appreciated that any lithic material capable of preferentially precipitating such metals from an aqueous solution may be employed as the precipitating agent.

The process may be practiced in various ways. Perhaps most generally, the acidic aqueous solution may be caused to flow through a natural stream of water containing at least one neutralizing agent and at least one precipitating agent. In another embodiment, the acidic aqueous solution is caused to flow through a gravel form of at least one neutralizing agent and at least one precipitating agent, thus increasing the surface area of contact between the aqueous solution and the at least two agents. Still, in another embodiment, the acidic aqueous solution would flow through pipe lined with various arrangements of at least one neutralizing agent and at least one precipitating agent.

DETAILED DESCRIPTION OF THE INVENTION

This invention is particularly applicable to treatment processes involving the reduction of acidity and the removal of metals, particularly dissolved metals. The treatment of acidic waters containing dissolved materials is the focus of the present invention.

One preferred embodiment of the invention is a single-stage or multi-stage process in which water is passed across or through a mixture of natural or synthetic lithic materials. The mixture placed in the reactor includes both a neutralizing agent along with at least on precipitating agent that preferentially precipitates metals from the aqueous solution. As mentioned above, the disclosure that the at least one precipitating agent "preferentially precipitates" metals indicates that the precipitating agent(s) serve as a preferred locus of deposition of metals when they precipitate from the aqueous solution during neutralization. This prevents the neutralizing agent from being coated, and allows it to continue its neutralizing function.

The selection of the actual lithic materials to be employed as the at least neutralizing agent and the at least one precipitating agent will depend upon the metal to be removed, the buffering capacity of the system, the chemistry of the solution and possibly other factors. The ratio of the mixed materials can be varied, as well as the number of types of materials, based on surface area, surface charge, weight, size, morphology and other characteristics. The preferred ratio of materials is 1 to 1.

A reactor for carrying out the process of the present invention may be a constructed vessel or a natural streamway that is modified in configuration. Distribution of the materials in the reactor could be as a homogeneous mixture, in alternating zones or on opposing sides.

In another preferred embodiment the invention is a process for removing metals from water by bringing the water in contact with at least one neutralizing agent, which may be limestone, marble, calcium carbonate, calcite, dolostone, dolomite and/or any other basic material. The water is also brought into contact with at least one precipitating agent, which may be sandstone, quartz, siltstone, quartzarenite, arkose, shale, feldspar, illite, gravel, granite, basalt, conglomerate, schist, slate, gneiss, diorite, gabbro, and rhyolite, or any other material that preferentially precipitates iron, iron oxide, silica, aluminum, aluminum oxide, magnesium, magnesium oxide, copper, copper oxide, chromium, chromium oxide, nickel, nickel oxide, lead, lead oxide, zinc, zinc oxide, cadmium, or any other dissolved or suspended metal during a change in the pH of the water. The water may be from any source which includes, but is not limited to, stream water, river water, ground water, natural and man-made reservoirs, run-off water, process water, waste water, sewage water, storm water, aquifers and lake water.

In another preferred embodiment the invention can be expressed as an apparatus for removing metals from aqueous solutions comprising at least one neutralizing agent as described above and at least one precipitating agents that preferentially precipitates metals, also as described above. In this embodiment the acidic water flows through a stream. The at least two agents are added as large blocks so that water passes over and around the blocks. The blocks can be arranged so that the at least one neutralizing agent and at least one precipitating agent material are alternated or are on opposing sides of the stream. Additionally, the blocks may be shaped as to maximize the area that comes into contact with the water.

In another preferred embodiment the invention is expressed as providing the at least two agents in gravel form. This may also enhance the efficacy of the invention in that the surface area of the at least two agents is greatly increased. The at least two agents, in gravel form, can be mixed or interspersed together or can be poured into the water either side by side or on opposite sides of the water path.

In another preferred embodiment the invention can be a pipe that is lined with the at least two agents. That is the neutralizing agent and the precipitating agent that preferentially receives the precipitate. The arrangement of the at least two agents is such that the water comes into contact with each one of the at least two agents. Illustrative examples of the arrangement include alternating rings of neutralizing and precipitating agents placing the neutralizing and precipitating agents on opposite sides of the pipe or filling the pipe with a mixture of small pieces of the neutralizing and precipitating agents materials so that the water flows around the pieces, such as is found in a gravel filter. The pipe can be smaller pipe that would be useful for commercial or industrial applications or can be a larger pipe, such as a large cement culvert. Any enclosed section through which water passes would be sufficient for this purpose.

In another preferred embodiment where an aqueous solution is to be treated to reduce its acidity and/or metal content, a pump is used to initiate contact between the water and the neutralizing and precipitating agent(s). This embodiment is particularly useful in a commercial or industrial setting. The invention can be arranged in a pipe as described above and a pump can facilitate water transfer through the pipe containing the at least one neutralizing agent and the at least one precipitating agent.

General Experimental

The vast majority of mines in the world occur in drainage basins containing no exposed limestone that could act as a natural neutralizing agent. However, on the Western Cumberland Plateau Escarpment of Tennessee (USA) where coal has been historically mined several stream basins exist where limestone is exposed. One such site is the Big Laurel Creek at the East Fork Obey River, a stream contaminated with acidic (pH 2–3) water. In this stream the precipitated metals coat the very neutralizing agent responsible for their removal. To study this process, the Tennessee stream water quality was characterized, and then lab tests and field experiments were performed to corroborate iron removal behavior in the presence of different lithic surfaces. It was unexpectedly discovered that:

1) metal removal has significant lithologic preferences, and
2) a mixture of limestone and sandstone is more efficient at removing metals than either of the materials alone.

Preference for a nucleation surface is related to a number of water quality and material variables, but it is also likely that suitability of the lithic surface as a substrate for *Thiobacillus ferrooxidans* or other microbials is a major factor. From studies of ferrous iron oxidation in packed-bed bioreactors, it has been shown that oxidation rate is kinetically controlled by the carrier matrix material, varying from about 3 kilograms/cubic meter/hour ($kg/m^3/h$) for glass beads to 50 $kg/m^3/h$ for activated carbon.

In Example 1, a river in Tennessee (USA) with preferential iron precipitation was characterized with respect to water quality and lithic surface morphology. In Example 2, a field experiment was conducted where lithic samples were placed in an Ohio stream receiving coal mine drainage demonstrating that iron hydroxide preferentially coats or precipitates onto quartz-rich lithologies. In Example 3, laboratory experiments confirm enhanced iron removal in the presence of mixed lithic surfaces. These results support the teachings herein, that the use of multiple lithic surfaces, particularly in-stream, provides an improved method for the treatment of acidic mine wastes, for the treatment of acidic industrial process and waste streams and for the removal of metals from aqueous solutions.

Barnstead Nanopure water was used for making all reagent solutions. Ferrous sulfate, ammonium oxalate, and potassium chloride were obtained from Fisher Scientific (Pittsburgh, Pa.). Lithic materials for the Silver Creek and laboratory experiments were collected by the authors (Columbus Limestone, Tuscarora Sandstone) or purchased from aggregate vendors (white marble, weathered gravel).

EXAMPLE 1

At Big Laurel Creek (East Fork Obey River, Fentress County, Tenn., USA) water samples were collected in new HDPE bottles at various times throughout the year. Conductivity, pH, temperature, and stream discharge were measured in the field. Anion samples were analyzed using ion chromatography. Cation samples were field-filtered and acidifed, and analyzed by DC-Plasma emission spectroscopy.

At the Big Laurel Creek/East Fork, Tenn. site, samples of the rocks were taken, and stream waters were analyzed under a variety of flow and seasonal conditions. The lithic material that received the greatest amount of metal oxide precipitate was a Pennsylvanian age sandstone, found as well-rounded cobbles in the streambed. Thin-section analysis showed the material to be composed primarily of quartz grains, with quartz cement. The limestone found in the streambed is derived from the Mississippian age Bangor and Monteagle formations. It is blocky (poorly rounded), and varies from 80 to 98% calcium carbonate, with minor calcium-magnesium carbonate, siliceous material, and aluminum and iron oxides. Neither the limestone nor the sandstone material is unusual in composition or fabric.

A summary of pertinent measured water chemistry is given in Table 1. The pH in the system varies from a low of 2.83 to a high of 3.84. As expected, at the low pH values observed in the stream, high sulfate and metal concentrations were measured, and for all samples, metal and sulfate concentrations increased with decreasing pH. The values seen for these major parameters are typical for streams receiving acid mine drainage.

EXAMPLE 2

To confirm that the observed coating distribution was the result of preferential precipitation, and not an artifact caused, for example, by mechanical erosion, a small scale field experiment was conducted at another mine drainage location, namely, Silver Creek, Ohio, USA. Previous studies at this site indicated active iron precipitation The hydrochemistry of the site at the time of the experiment is given in Table 2.

At Silver Creek (Summit) gravel-sized (approximately 3 centimeters in diameter) samples representing a variety of lithic surfaces were placed in the stream for 30 days. The samples included Tuscarora Sandstone, Columbus Limestone, a white marble, and a mixture of well rounded quartz and sandstone pebbles (termed weathered gravel). The samples were marked, and placed in mesh bags within a culvert to control the effects of mixing, turbulence, exposure to sunlight, and depth of submergence.

Visual examination and quantification of the lithic samples in the stream after 30 days indicated that the quartz-rich samples were more heavily coated with iron precipitate than the carbonate samples. Qualitative examination of the samples after 30 days indicated that the quartz-rich samples were more heavily coated with iron precipitate than the carbonate samples. Quantitative measurement of iron coatings was made before and after placement in the stream by dissolution with ammonium oxalate on a 10% split of each sample. Total iron was analyzed using an inductively coupled plasma atomic emission spectrometer (ICP-AES) and compared with samples not placed in the stream. Table 3 demonstrates that the amount of metal coating is lithology specific, with quartz-rich material having an order of magnitude greater coating than the carbonate lithologies.

EXAMPLE 3

Based on the Silver Creek field results with the Tuscarora Sandstone and Columbus Limestone, a batch experiment was performed to examine the metal removal kinetic behavior of these materials. Batch reactors (HDPE bottles) were loaded with lithic material (crushed and sorted to a #7 sieve) and Silver Creek water spiked with ferrous iron. The temperature was 20° C. and pH was allowed to vary naturally for the duration of the experiment. After approximately 75 minutes of mixing, the solution was removed and analyzed using ICP spectroscopy.

A control batch which had no samples in it showed less than 1% removal of Fe. Table 4 shows that the mix of both Tuscarora and Columbus materials resulted in greater iron removal (50.5%) than Columbus alone (32.6%) under nearly identical pH conditions. This was not expected based on iron removal in the presence of each material separately. This confirms a synergistic effect related to individual material properties. These results are in agreement with both the observations made in the Obey River, and the experimental Silver Creek location, and clearly point to lithic surface controlled removal of metals.

EXAMPLE 4

An electrokinetic analyzer (EKA) was used to determine lithic sample zeta potential as a function of pH. A remote controlled titration unit was used to gradually increase solution pH with addition of sodium hydroxide. Lithic samples crushed and sorted to a #7 sieve were placed in a Type GT-2 glass-Teflon electrophoresis cell and data was collected by equipment software (EKS 100, RV 4.25). The software uses electrophoretic mobility data measured by the EKA to compute zeta potential according to the Fairbrother-Mastin equation. Samples were soaked overnight in a $10^{-4}$ M KCl electrolyte before analysis.

The surface charge was analyzed over the pH range measured during the experiments. Tuscarora Sandstone has a more negative surface charge than Columbus Limestone. This would indicate that in addition to more rapid aqueous Fe(II) oxidation at pH 6.5 due to increased hydroxide ion, the decrease in zeta potential (i.e. surface charge) with increasing pH would promote Fe(II) surface reaction. A synergistic effect clearly occurs when limestone and sandstone are mixed, prompting the precipitation of metal oxides on the sandstone, while allowing the limestone to remain uncoated and continue neutralizing the solution. These results are consistent with both the observations made in the Obey River, and the experimental Silver Creek location.

TABLE 1

Measured chemical values for East Fork Obey River. Units as specified. Specific Conductance (SpC) has been normalized to 25° C.

| Sample | Al (mg/L) | Ca (mg/L) | Fe (mg/L) | Mg (mg/L) | SO$_4$ (mg/L) | pH | Temp Celsius | SpC (FS) | Discharge (CFS) |
|---|---|---|---|---|---|---|---|---|---|
| 8 | 12.60 | 26.1 | 13.9 | 14.0 | 220 | 3.21 | 6.3 | 662 | 57.0 |
| 18 | 29.50 | 80.0 | 17.3 | 35.0 | 490 | 2.83 | 22.1 | 1492 | 0.6 |
| 40 | 11.10 | 30.0 | 5.3 | 12.9 | 165 | 3.39 | 6.6 | 592 | 3.2 |
| 49 | 3.14 | 10.2 | 1.9 | 4.1 | 53 | 3.84 | 11.6 | 193 | 530.0 |
| 59 | 13.90 | 26.1 | 16.0 | 14.0 | 235 | 3.20 | 12.9 | 686 | 20.0 |

TABLE 2

Hydrochemistry of Silver Creek at the time of experiment.

| Al (mg/L) | Ca (mg/L) | Fe (mg/L) | Mg (mg/L) | SO$_4$ (mg/L) | pH | Temp (EC) | SpC (FS) | Discharge (CFS) |
|---|---|---|---|---|---|---|---|---|
| 0.20 | 49.1 | 18.8 | 19.4 | 119 | 5.94 | 11.1 | 692 | 0.34 |

TABLE 3

Mineralogy of samples and mass of iron coatings on various materials after 30 days exposure in Silver Creek. Values are expressed as grams of ammonium oxalate extractable iron per kilogram of sample material.

| Sample | Day 0 Fe (mg/kg) | Day 30 Fe (mg/kg) | Change (mg/kg) | Mineralogy |
|---|---|---|---|---|
| Tuscarora Sandstone | 15.62 | 59.90 | 44.28 | Quartz, with minor feldspar & kaolinite |
| Weathered Gravel | 5.00 | 17.30 | 12.30 | Quartz |
| Columbus Limestone | 1.17 | 4.38 | 3.21 | Calcite & dolomite |
| White Marble | 1.88 | 3.83 | 1.95 | Calcite, with minor dolomite |

TABLE 4

Iron removal in the presence of Tuscarora Sandstone
and Columbus Limestone. Materials were crushed
and sorted to a #7 sieve. Batch reactors with
10 grams of solid material and 100 mL of Silver Creek water
spiked with ferrous iron (pH = 4.5).

| Material | Time minutes | Initial pH | Final pH | [Fe]o (mg/L) | [Fe]f (mg/L) | Removal % |
|---|---|---|---|---|---|---|
| Tuscarora Sandstone | 73 | 4.6 | 4.5 | 38.1 | 36.0 | 5.6 |
| Columbus Limestone | 75 | 6.6 | 6.5 | 38.0 | 25.6 | 32.6 |
| Mixed* | 77 | 6.5 | 6.4 | 38.2 | 18.9 | 50.5 |

*5 g of Tuscarora and 5 g of Columbus

Field and laboratory results, along with material property considerations, show that specific lithic surfaces can control precipitation of metals from an aqueous solution undergoing a change in pH. The actual removal mechanism is probably a function of water chemistry, flow condition, material texture, material composition, surface charge, biota, and possibly other factors alone or in combination. Transferring to full-scale passive treatment systems leads to improved performance and reduced costs by focusing metal precipitation to surfaces other than the neutralizing agent, thereby leaving the neutralizing agent available for pH reduction.

Based upon the foregoing disclosure, it should now be apparent that the method described herein will carry out at least one of the objects set forth hereinabove. It is therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A process for removing metals from an aqueous solution comprising the steps of:
   distributing at least one lithic neutralizing agent and at least one lithic precipitating agent to preferentially precipitate said metals from said aqueous solution onto the precipitating agent; and
   contacting said aqueous solution with said at least one lithic neutralizing agent and said at least one lithic precipitating agent.

2. The process of claim 1, wherein the at least one neutralizing agent is selected from the group consisting of limestone, marble, calcium carbonate, calcite, dolostone and dolomite.

3. The process of claim 1, wherein the metals are selected from the group consisting of iron, iron oxide, silica, aluminum oxide, magnesium oxide, copper oxide, chromium oxide, nickel oxide, lead oxide, zinc, zinc oxide, aluminum, magnesium, cadmium, copper, chromium, nickel, lead.

4. The process of claim 1, wherein said step of contacting an aqueous solution involves adding the at least one neutralizing agent and at least one precipitating agent to a natural stream of water.

5. The process of claim 4, wherein the at least one neutralizing agent and at least one precipitating agent are added in gravel form.

6. The process of claim 1, wherein said step of contacting an aqueous solution involves passing the aqueous solution through a pipe that includes both the at least one neutralizing agent and the at least one precipitating agent.

7. The process of claim 6, wherein the at least one neutralizing agent and the at least one precipitating agent are provided in the pipe as a mixture of pieces of the at least one neutralizing agent and the at least one precipitating agent.

8. The process of claim 6, wherein the at least one neutralizing agent and the at least one precipitating agent are provided in the pipe as alternating rings.

9. The process of claim 6, wherein said step of contacting an aqueous solution includes utilizing a pump to urge the aqueous solution through the pipe.

10. A process for removing metals from an aqueous solution comprising the steps of:
    providing a lithic neutralizing agent and a lithic precipitating agent;
    exposing the aqueous solution to a surface of each of the neutralizing agent and the precipitating agent; and
    preferentially precipitating the metals from the aqueous solution on the precipitating agent relative to the neutralizing agent.

11. A process for removing metals from an aqueous solution comprising the steps of:
    providing at least one neutralizing agent and at least one precipitating agent in a pipe as alternating rings;
    passing the aqueous solution through the pipe that includes both the at least one neutralizing agent and the at least one precipitating agent; and
    contacting said aqueous solution with the at least one lithic neutralizing agent and the at least one lithic precipitating agent that preferentially precipitates metals from the aqueous solution.

12. A process for removing metals from an aqueous solution comprising the steps of:
    contacting said aqueous solution with at least one lithic neutralizing agent and at least one lithic precipitating agent that preferentially precipitates metals from the aqueous solution, wherein the at least one precipitating agent is selected from the group consisting of sandstone, quartz, siltstone, quartzarenite, arkose, shale, feldspar, illite, gravel, granite, basalt, conglomerate, schist, slate, gnesis, diorite, gabbro, and ryholite.

* * * * *